Sept. 5, 1939.   L. H. KIRK ET AL   2,171,753
OPHTHALMIC MOUNTING
Filed Oct. 6, 1938
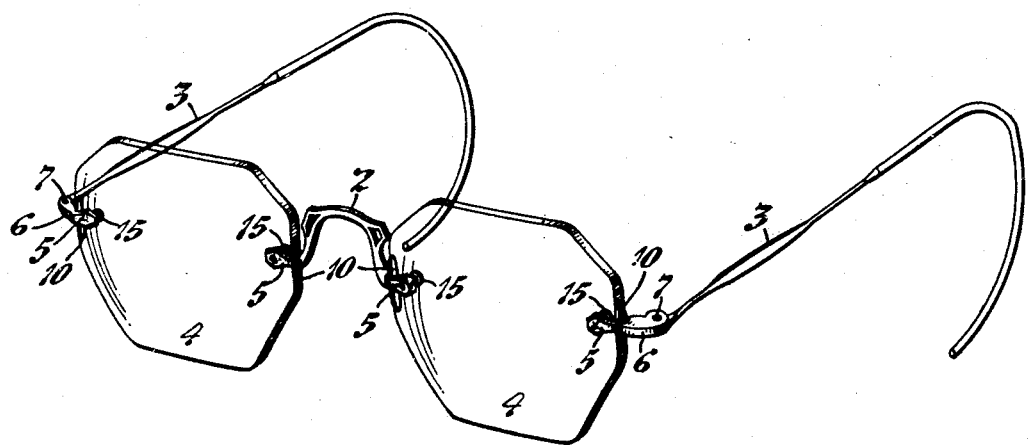
Fig.1.
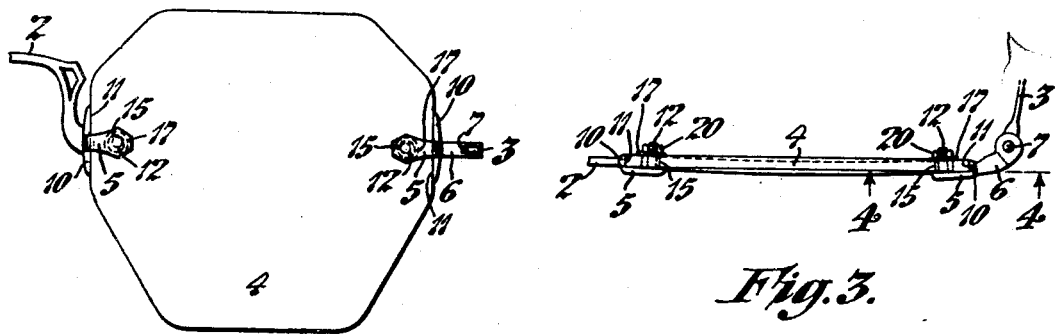
Fig.2.   Fig.3.
Fig.8.
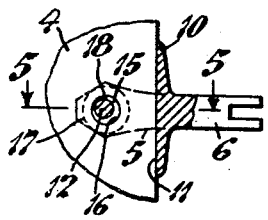 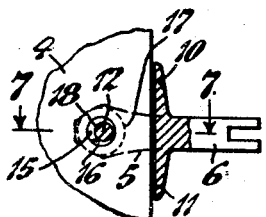 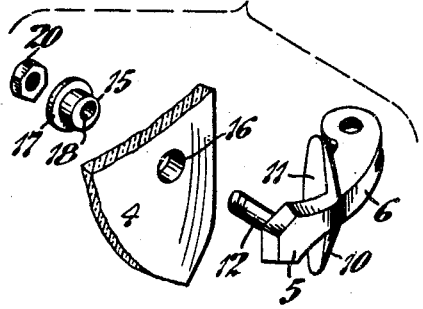
Fig.4.   Fig.6.
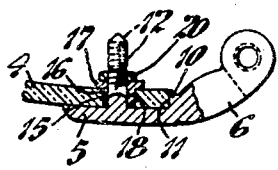 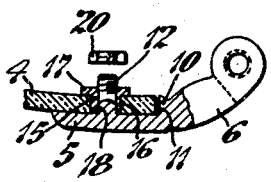
Fig.5.   Fig.7.
Inventors:
Lloyd H. Kirk and
Bror J. Jacobson
By
Attorneys.

Patented Sept. 5, 1939

2,171,753

UNITED STATES PATENT OFFICE 2,171,753

OPHTHALMIC MOUNTING

Lloyd H. Kirk, Cranston, and Bror J. Jacobson, Warwick, R. I., assignors to Martin-Copeland Company, a trusteeship consisting of Edgar W. Martin, E. Cornell Martin, and Laurence C. Martin Application October 6, 1938, Serial No. 233,614

10 Claims. (Cl. 88—47)

The present invention relates to ophthalmic mountings and particularly to improvements in means for securing the nose-pieces or bridges and the temples to the lenses of rimless eyeglasses and spectacles.

One object of the invention is to provide a mounting of the type indicated having means for attaching the bridge, and in the case of spectacles, the temples to the lenses without requiring accurate location of the screw holes therein.

Another object of the invention is to provide a mounting of the type indicated which is adjustable to provide a close fit against the edge of the lens irrespective of the exact location of the hole in the lens.

Another object of the invention is to provide a mounting of the type indicated which is held snugly against the edge of the lens to prevent play and looseness in the parts attached thereto.

Another object of the invention is to provide a mounting of the type indicated having a resilient bearing within the hole in the lens to absorb shock and jar and prevent breakage of the latter when the eyeglasses or spectacles are dropped or handled roughly.

Another object of the invention is to provide a mounting of the type indicated which is highly ornamental in appearance without the fastening screw or other mechanical means showing at the front of the lens.

Another object of the invention is to provide a mounting of the type indicated which is more convenient to assemble with the lens and more readily applicable thereto for repair or replacement.

Another object of the invention is to provide a mounting of the type indicated which is simple in construction, neat and finished in appearance, and generally more efficient for the purposes specified.

Further objects of the invention are set forth in the following specification which describes a preferred form of construction of the improved mounting, by way of example, as illustrated by the accompanying drawing. In the drawing:

Fig. 1 is a perspective view illustrating a pair of rimless spectacles embodying the present improved means for attaching the nose-piece or bridge and the temples to the lenses;

Fig. 2 is an enlarged front view of one of the lenses showing the present improved mounting applied to use therewith;

Fig. 3 is an edge view of the same;

Fig. 4 is a further enlarged detailed view of the mounting, shown part-sectional on line 4—4 of Fig. 3;

Fig. 5 is a part-sectional view of the same taken on line 5—5 of Fig. 4;

Fig. 6 is a view similar to Fig. 4 showing the mounting before its adjustment with its shoe spaced at a distance from the edge of the lens;

Fig. 7 is a part-sectional view of the same taken on line 7—7 of Fig. 6; and

Fig. 8 is a perspective view of the several elements of the mounting showing a fragment of the lens and illustrating the several parts in disassembled relationship.

The usual type of mounting for attaching the nosepiece or bridge to the lenses of rimless eyeglasses, and also for attaching the temples to the lenses of rimless spectacles, is provided with means bearing against the edge of the lens and having strap portions straddling its opposite sides. The strap portions are usually perforated with holes through which a screw is inserted to project through a hole in the lens with its end threaded into one of the straps. It is almost impossible to drill the holes in the lenses with such accuracy as to insure that they will all be located at the same distance from the edges of the lenses and therefore in some cases the mountings cannot be fitted with their shoe-portions bearing snugly against the edges of the lenses. Moreover, if the holes are of larger diameter than the screws which attach the mountings to provide for adjustment of the latter to fit their shoes against the edges of the lenses the screws will be loose in the holes, causing play and shackly joints between the lenses and the parts attached thereto. For these reasons, as is well known, the mountings of rimless eyeglasses and spectacles require frequent adjustment and tightening of their screws which is an inconvenience to the wearer.

To overcome the defects and deficiencies of previously-used devices the present invention provides a mounting having a screw or stud formed as a part thereof and inserted through a resilient sleeve or bushing which fits the hole in the lens to cushion the joint. Preferably, the screwhole in the bore of the sleeve or bushing is positioned eccentric to its periphery whereby the bushing may be rotated on the screw or stud to adjust the mounting with its shoe snugly abutting the edge of the lens. A nut threaded to the end of the stud or screw serves to draw the parts together and, preferably, the bushing has a flange or collar overlying the hole in the rim of the lens and against which the nut impinges to further cushion the joint and hold the nut from unscrewing.

Referring to the accompanying drawing the present improved mounting is herein shown as applied to a pair of rimless spectacles for attaching the bridge or nose-piece 2, and also the temples 3, to the lenses. The mounting is preferably made integral with the bridge or nose-piece 2 projecting from the sides thereof in the form of a strap or ear 5 of ornamental design. As herein illustrated the strap or ear 5 of the mounting is of substantially hexagonal shape with beveled facets and a tapering arm joined to the side of the nose-piece 2, but it may be shaped to any other artistic contour. In the case of the mounting for temples 3 the ear or strap 5 is formed as a part of a bifurcated hinge member 6 to which the end of the temple 3 is pivoted by means of a screw or rivet 7, see Figs. 2 and 3.

Referring more particularly to Figs. 4 to 8, inclusive, the ear or strap 5 is joined to an elongate shoe 10 which may be of lenticular shape with its flat face 11 adapted to abut the edge of the lens 4, see Fig. 4. When the mounting is to be used with lenses of a circular outline the shoe 10 may be formed or bent to arcuate shape on its inner face to adapt it to fit snugly against the curved edge of the lens.

Projecting perpendicularly from the inner face of the ear or strap 5 is a stud 12 formed with screw-threads at its end. Usually, the stud or screw 12 is made of considerable length and pointed at its end as indicated by dotted lines in Fig. 5, the extra length providing that it may be used with lenses of varying thickness.

The sleeve or bushing 15, shown in perspective in Fig. 8, is provided for insertion through the hole 16 in the lens 4, the bushing being preferably formed with an offset rim or flange 17 adapted to abut the inner face of the lens as shown in Figs. 5 and 7. A nut 20 is interiorly threaded to screw onto the end of the stud or screw 12 in engagement with the end of the bushing 15.

As one improved feature of the present invention the sleeve or bushing 15 is constructed with its bore 18 located eccentrically of its periphery. The purpose of this arrangement is to provide that when the bushing is turned in the hole 16 of the lens 4 it will adjust the position of the screw or stud 12 to draw the shoe 10 snugly against the edge of the lens 4.

In applying the mounting to the lens the bushing 15 is first inserted through the hole 16 from the rear with its rim or flange 17 abutting the inner face of the lens, it being noted by reference to Figs. 5 and 7 that the body of the bushing is of less length than the thickness of the lens at the location of the hole 16. The ear 5 of the mounting is next placed against the forward face of the lens 4 by inserting its screw 12 through the bore 18 in the bushing 15 or, if preferred, the mounting may first be placed in position on the lens and the bushing 15 applied to the screw thereafter. With the parts thus assembled the shoe 10 will usually have its face 11 spaced slightly away from the edge of the lens 4, as shown in Figs. 6 and 7, and by rotating the bushing 15 the screw 12 can be adjusted laterally of the hole 16 of the lens 4 to draw the shoe snugly against the edge of the lens as illustrated in Figs. 4 and 5. The nut 20 is then screwed onto the end of the stud or screw 12 and set up against the flanged end of the bushing 15 to secure the parts rigidly in juxtaposition.

Preferably, the bushing 15 is constructed of material such as that sold under the trade-mark "Celluloid" or "Zylonite" or it may be of any other plastic or resilient material. When the nut 20 is set up against the end of the bushing it will take a firm grip thereon tending to secure it from becoming released or loosened and thus preventing accidental or unwarranted loosening or disconnection of the parts. Moreover, the use of a resilient material in the construction of the bushing 15 provides for cushioning the joints between the parts to absorb the shock and strain when the glasses are dropped or roughly handled.

After the parts have been assembled in the manner explained above the projecting end of the screw or stud 12, indicated by dotted lines in Fig. 3, may be cut off by the use of cutting pliers or any other suitable tool, thus providing a smooth finish at the end of the nut 20.

It will be observed from the foregoing that the present invention provides a particularly staunch and rugged connection between the mounting and the lens with protection against breakage of the glass when the nut is set up against the bushing and also insurance against fracture of the lenses when the spectacles are dropped. As a particular feature of the improvement, the present mounting may be adjusted with respect to the edge of the lens so that it is adapted to fit lenses in which the holes are not drilled uniformly at the same distance from their edges. In other words, the mounting is adapted to be used on lenses in which the distance between the hole and the edge of the lens varies considerably, the provision of the eccentric bushing properly regulating the position of the shoe of the mounting with respect to the edge of the lens.

As a further feature of improvement, the provision of the flanged bushing obviates the use of a two-part strap on the mounting for straddling the sides of the lens. With the usual form of mounting having opposite straps for straddling the sides of the lens it is practically impossible to make the traps fit snugly against the faces of the lenses where the latter are ground to different contours. In cases where the lenses taper toward their edges only one strap portion will fit flat against the side of the lens while the opposite strap will be inclined with respect thereto so that a snug, secure connection cannot be made. With lenses having their inner faces of greater concavity than the convexity of the outer faces the opposite straps may bind against the outer edges of the lens but will not contact at all points therebeyond so that the joint cannot be made secure.

As still another feature of the improvement the mechanical means for attaching the present mounting to the lens is at the rearward side thereof and therefore invisible from the front where the glasses are usually observed, the forward portions of the mounting being of ornamental shape to heighten the artistic effect.

While the present improved mounting is herein shown and described as embodied in a preferred form of construction it is to be noted that various modifications may be made in the structure and arrangement of its parts without departing from the spirit or scope of the invention. Therefore, without limiting ourselves to the exact construction shown, we claim:

1. An improved mounting for eyeglasses and spectacles comprising a member having a portion adapted to overlie one face of the lens and a shoe for engagement with the edge thereof, an annular resilient bushing fitting the hole in the lens and having a bore disposed eccentrically of its periphery, a rigid and non-rotatable stud extending from the mounting through the bore in the bushing, and means engaging said stud for securing the mounting to the lens.

2. An improved mounting for eyeglasses and spectacles comprising a member having a portion adapted to abut one side of the lens with means for engaging against the edge thereof, an annular resilient bushing fitting the hole in the lens and having a bore disposed eccentrically of its periphery, a rigid and non-rotatable stud projecting from the mounting through the annular bushing, said stud having screw threads thereon, and a nut threaded onto the end of the stud to secure the mounting to the lens.

3. An improved mounting for eyeglasses and spectacles comprising a member formed to abut one face of the lens and having means for engaging the edge thereof, an annular resilient bushing of a length less than the thickness of the lens fitting the hole in the lens and having a flange overlying the face thereof opposite from the mounting, a rigid and non-rotatable member having a screw-threaded portion projecting from the mounting through the annular bushing, and a nut threaded onto the said screw-portion of the member and set up against the flanged end of the bushing.

4. An improved mounting for eyeglasses and spectacles comprising a member adapted to abut one side of the lens and provided with means for engaging the edge thereof, a bushing of yieldable material fitting the hole in the lens and formed with a bore disposed eccentrically of its periphery, a non-rotatable member having a screw-threaded portion extending from the mounting through the bore in the bushing, and means engaging the screw-threaded portion of said member for securing the mounting to the lens.

5. An improved mounting for eyeglasses comprising a member having a portion adapted to abut the outer face of a lens and provided with means for engaging the edge thereof, an annular resilient bushing fitting the hole in the lens and formed with a bore disposed eccentrically of its periphery and a flange at its end adapted to abut the inner face of the lens, a non-rotatable member having a screw-threaded portion integral with the mounting member projecting through the bore of the bushing, and a nut threaded onto the end of the screw-portion of said member and set up against the flanged end of the bushing to secure the mounting fixedly to the lens.

6. An ophthalmic mounting comprising lenses having connection openings, and lens-connecting means comprising a lens-strap having a portion engaging the edge of the lens and a connecting portion overlying one face of the lens, said portion overlying the face of the lens having a rigid and non-rotatable projecting stud extending into the opening in the lens with interlocking means adjacent its outer end, a resilient bushing of a length less than the thickness of the lens fitted into the opening of the lens and having a bore in which the stud extends, said bore being disposed eccentrically of the axis of the opening in the lens, said bushing having a projecting shoulder on the side opposite the lens-connecting ear and overlying the edge of the opening in the lens, and interlocking means engaged with the interlocking means of the stud beyond the shoulder of the bushing to hold the mounting and lens together.

7. An ophthalmic mounting comprising lenses having openings for the reception of lens-holding members, and lens-connecting means comprising a lens-strap having a portion engaging the edge of the lens and a connecting portion overlying the face of the lens, said portion overlying the face of the lens having a rigid and non-rotatable projecting stud extending into the opening in the lens with interlocking means adjacent its outer end, a bushing of a length less than the thickness of the lens fitting the opening in the lens and having a bore through which the stud extends, said bushing having its bore disposed eccentrically of its periphery and a shoulder overlying the edge of the opening in the lens on the side of the lens opposite from the lens-engaging ear, and interlocking means engaging the interlocking means on the stud beyond the shoulder of the bushing to hold the mounting and lens assembled and to frictionally lock the bushing against turning.

8. The process of assembling an ophthalmic mounting of the character described comprising providing lens-holding means having a portion for engaging the edge of a lens and a portion for engaging a face of said lens and having a rigid and non-rotatable stud with connecting means thereon, inserting said stud through an opening in the lens, placing a bushing of yieldable material having an eccentric bore and a flange adjacent one end thereof on said non-rotatable stud within the opening in the lens, rotating said bushing on said stud to such an extent as to cause the yielding characteristics thereof to tightly engage the edge-engaging portion of the lens-holding means with the edge of the lens and yet be relieved from strain on the lens by the yielding nature of the bushing, and securing a connecting member to said connecting means of the stud in such a manner as to secure the lens-holding means to the lens without altering the tightness of fit of its edge-engaging portion with the edge of the lens and to simultaneously lock the bushing of yieldable material against turning.

9. Connecting means for securing an ophthalmic mounting to a lens having an opening for the connecting means comprising a lens-strap having a portion for engaging the edge of the lens and a connecting portion for overlying the face of the lens, said portion for overlying the face of the lens having a projecting stud non-rotatably connected to the lens-strap adapted to extend into the opening in the lens and having interlocking means adjacent its outer free end, a bushing having a body portion adapted to fit within the opening in the lens and having a shouldered portion for engaging the edge of the opening in the lens, said body portion having a bore disposed eccentrically of its periphery through which the stud is adapted to extend and being of a length which, when fitted in the opening in the lens with the shouldered portion engaging the edge of the opening in said lens, is less than the thickness of the lens by an amount which will provide a space between the inner end of said body portion and the adjacent inner surface of the lens-strap whereby the said body portion will be free to move in a direction longitudinally of the opening in the lens to allow the shouldered portion to be moved into frictional contact with the adjacent surface of the lens and separate interlocking means for engaging the interlocking means on the stud and which may be tightened to introduce a binding action between the lens-strap and lens and frictionally lock the bushing against turning.

10. An ophthalmic mounting comprising lenses having openings for the reception of lens holding members and lens connecting means comprising a lens-strap having a portion engaging the edge of the lens and a connecting portion overlying a face of the lens, said portion overlying a face of the lens having a projecting stud non-rotatably connected to the lens-strap and extending into the opening in the lens and having interlocking means adjacent its outer free end, a bushing having a body portion fitting within the opening in the lens and having a shouldered portion engaging the edge of the opening in the lens, said body portion having a bore disposed eccentrically of its periphery through which the stud is extended and being of a length, with the shouldered portion engaging the edge of the opening in said lens, that is less than the thickness of the lens so that the inner end of said body portion is in spaced relation with the adjacent inner surface of the lens-strap whereby the said body portion is free to move in a direction longitudinally of the opening in the lens to allow the shouldered portion to be moved into frictional contact with the adjacent surface of the lens and separate interlocking means in engagement with the interlocking means on the stud tightened so as to introduce a binding action between the lens-strap and lens and frictionally lock the bushing against turning.

LLOYD H. KIRK.
BROR J. JACOBSON.